US012705236B2

(12) United States Patent
Raghupathy et al.

(10) Patent No.: US 12,705,236 B2
(45) **Date of Patent: *Aug. 11, 2026**

(54) SYSTEMS AND METHODS FOR DISCOVERY, CLASSIFICATION, AND INDEXING OF DATA IN A NATIVE COMPUTING SYSTEM

(71) Applicant: OneTrust, LLC, Atlanta, GA (US)

(72) Inventors: Haribalan Raghupathy, Seattle, WA (US); Saravanan Pitchaimani, Atlanta, GA (US); Jonathan Lynn, Seattle, WA (US); Rahul Shinde, Seattle, WA (US); Kevin Jones, Atlanta, GA (US); Subramanian Viswanathan, San Ramon, CA (US); Mahesh Sivan, Atlanta, GA (US); Zara Dana, San Francisco, CA (US); Milap Shah, Bengaluru (IN); Sivanandame Chandramohan, Atlanta, GA (US); Abhishek Upadhyay, Bengaluru (IN); Anand Balasubramanian, Bengaluru (IN)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/080,112

(22) Filed: Mar. 14, 2025

(65) Prior Publication Data

US 2025/0217359 A1 Jul. 3, 2025

Related U.S. Application Data

(63) Continuation of application No. 18/312,498, filed on May 4, 2023, now Pat. No. 12,259,882, which is a (Continued)

(51) Int. Cl.
*G06F 9/50* (2006.01)
*G06F 16/22* (2019.01)
(Continued)

(52) U.S. Cl.
CPC ...... *G06F 16/24524* (2019.01); *G06F 9/5055* (2013.01); *G06F 16/22* (2019.01);
(Continued)

(58) Field of Classification Search
CPC .. G06F 16/24524; G06F 9/5055; G06F 16/22; G06F 18/217; G06F 40/284; G06F 16/951; G06Q 10/063
See application file for complete search history.

(56) References Cited

U.S. PATENT DOCUMENTS 5,966,703 A * 10/1999 Burrows ............... G06F 16/319 707/999.102
7,340,776 B2 * 3/2008 Zobel .................... G06F 21/577 713/188

(Continued)

*Primary Examiner* — Jorge A Casanova
(74) *Attorney, Agent, or Firm* — Ballard Spahr LLP

(57) ABSTRACT

In general, various aspects provide methods, apparatuses, systems, computing devices, computing entities, and/or the like for performing data discovery on a target computing system. In various aspects, a third party computing connects, via a public data network, to an edge node of the target computing system and instructs the target computing system to execute jobs to discover target data stored in data repositories in a private data network in the target computing system. In some aspects, the third party computing system may schedule the jobs on the target computing system based on computing resource availability on the target computing system.

20 Claims, 8 Drawing Sheets

Related U.S. Application Data continuation of application No. 17/584,187, filed on Jan. 25, 2022, now Pat. No. 11,687,528.

(60) Provisional application No. 63/141,216, filed on Jan. 25, 2021.

(51) Int. Cl.

| | |
|---|---|
| ***G06F 16/2452*** | (2019.01) |
| ***G06F 18/21*** | (2023.01) |
| ***G06F 40/284*** | (2020.01) |
| ***G06Q 10/063*** | (2023.01) |

(52) U.S. Cl.

CPC .......... *G06F 18/217* (2023.01); *G06F 40/284* (2020.01); *G06Q 10/063* (2013.01)

(56) References Cited

U.S. PATENT DOCUMENTS

| | | | | |
|---|---|---|---|---|
| 10,725,993 | B1 * | 7/2020 | Sivasubramanian | G06F 16/2272 |
| 11,687,528 | B2 * | 6/2023 | Raghupathy | G06F 9/5055 707/716 |
| 12,335,348 | B1 * | 6/2025 | Martin | G06F 9/455 |
| 12,452,272 | B1 * | 10/2025 | Subramanian | H04L 67/535 |
| 12,457,231 | B1 * | 10/2025 | Erlingsson | G06F 9/545 |
| 12,463,996 | B1 * | 11/2025 | Welsh | G06F 16/9535 |
| 12,483,576 | B1 * | 11/2025 | Guo | G06F 16/9537 |
| 12,563,060 | B1 * | 2/2026 | Sobrier | G06F 16/9535 |
| 2011/0022582 | A1 * | 1/2011 | Unnikrishnan | G06F 16/953 707/715 |
| 2015/0339352 | A1 * | 11/2015 | Bice | G06F 16/2445 707/722 |
| 2020/0410116 | A1 * | 12/2020 | Williamson | G06N 20/00 |
| 2021/0150056 | A1 * | 5/2021 | Vax | G06F 16/285 |
| 2022/0197306 | A1 * | 6/2022 | Cella | G05D 1/0297 |
| 2024/0080329 | A1 * | 3/2024 | Reed | H04L 63/10 |
| 2024/0256358 | A1 * | 8/2024 | Wu | G06F 9/5027 |
| 2024/0259386 | A1 * | 8/2024 | Wu | H04L 63/105 |
| 2026/0044501 | A1 * | 2/2026 | Gorti | G06F 16/24522 |

* cited by examiner

SYSTEMS AND METHODS FOR DISCOVERY, CLASSIFICATION, AND INDEXING OF DATA IN A NATIVE COMPUTING SYSTEM

CROSS-REFERENCE TO RELATED APPLICATIONS

This application is a continuation of U.S. patent application Ser. No. 18/312,498, filed on May 4, 2023, which is a continuation of U.S. patent application Ser. No. 17/584,187, filed on Jan. 25, 2022, which claims the benefit of and priority to U.S. Provisional Patent Application No. 63/141,216, filed on Jan. 25, 2021. Each of the aforementioned applications is hereby incorporated by reference in its entirety.

TECHNICAL FIELD

The present disclosure is generally related to computing systems and methods used for discovering, classifying, and indexing target data stored across various data assets.

BACKGROUND

A significant challenge encountered by many organizations is that requests for particular data may encompass a large number of computing systems which may, for example, store data in both structured and unstructured formats. Accordingly, an organization's processing of such requests can require a significant amount of computing resources, especially when the organization is required to process such requests in a relatively short period of time. Existing systems for complying with such requests can be inadequate for producing and providing the required information within the required timelines. This is especially the case for large corporations, which may store data on several different platforms in differing locations. Therefore, a need exists in the art for improved systems and methods for discovering and identifying data in order to process such requests.

SUMMARY

A system, according to some aspects, comprises a non-transitory computer-readable medium storing instructions; and a processing device communicatively coupled to the non-transitory computer-readable medium. In various aspects, the processing device is configured to execute the instructions and thereby perform operations comprising: (1) deploying, from a first computing system, via a public data network, a client application on a target computing system, the target computing system comprising a plurality of data sources in a private data network; (2) receiving, from the client application, at the first computing system, target computing system resource data for computing resources available to the target computing system; (3) causing, by the client application, the target computing system to use the computing resources available on the target computing system to scan the plurality of data sources in the private data network to discover target data stored on the plurality of data sources based on the target computing system resource data; and (4) responsive to discovering the target data stored on the plurality of data sources, generating and storing metadata for each of the plurality of data sources, the metadata indicating at least one of a type of the target data, a number of instances of the target data, or a location of the target data on each of the plurality of data sources.

In some aspects, the operations further comprise generating, by the first computing system, a catalog of data on the plurality of data sources; and creating, by the first computing system, a job schedule based on the catalog. In some aspects, causing the target computing system to use the computing resources available on the target computing system to scan the plurality of data sources in the private data network comprises causing the target computing system to execute each job in the job schedule based on the target computing system resource data. In various aspects, each job in the job schedule comprises classifying, by the target computing system, data from each item in the catalog to identify the type of the target data stored on each item in the catalog. In some aspects, classifying the data from each item in the catalog comprises tokenizing the data from each item in the catalog to generate tokenized data, labeling the tokenized data to generate labelled data, and classifying the data as target data based on the labelled data.

In some aspects, receiving the target computing system resource data for the computing resources available to the target computing system comprises receiving current resource usage by the target computing system and total available resources for the target computing system; and causing the target computing system to use the computing resources available on the target computing system to scan the plurality of data sources in the private data network based on the target computing system resource data comprises scheduling jobs to the target computing system such that executing the jobs does not cause the current resource usage to exceed the total available resources. In other aspects, causing the target computing system to use the computing resources available on the target computing system to scan the plurality of data sources in the private data network based on the target computing system resource data comprises scheduling discovery to the target computing system during at least one of a particular time period, a particular part of the day, or during a particular day. In still other aspects, causing the target computing system to use the computing resources available on the target computing system to scan the plurality of data sources in the private data network based on the target computing system resource data comprises scheduling jobs to the target computing system such that the target computing system does not execute more than a particular number of simultaneous jobs.

In particular aspects, the operations further comprise: (1) receiving an indication of a data subject access request received from a client device via a user interface that is accessible via the public data network and is configured for querying the plurality of data sources included in the private data network, the data subject access request identifying a data subject; and (2) responsive to receiving the indication, facilitating, by the target computing system, execution of processing operations or network communication for retrieving data responsive to the data subject access request from the plurality of data sources included in the private data network by accessing the metadata and identifying a subset of the plurality of data sources that store target data, and facilitating, by the target computing system, execution of processing operations or network communication for retrieving the data responsive to the data subject access request on the subset of the plurality of data sources that store target data.

A method, according to some aspects, comprises: (1) deploying, by computing hardware, via a public data network, a client application on a target computing system, the target computing system comprising a plurality of data sources in a private data network; (2) cataloging, by the computing hardware, data from the plurality of data sources in the private data network, the catalog identifying each file across the target computing system that requires scanning for target data; (3) creating, by the computing hardware, a plurality of jobs based on the catalog, each of the plurality of jobs corresponding to a respective file from the target computing system; (4) generating, by the computing hardware, a schedule for executing the plurality of jobs based on computing resource availability at the target computing system; (5) causing, by the computing hardware via the client application, the target computing system to use computing resources available to the target computing system to scan the plurality of data sources in the private data network to discover the target data stored on the plurality of data sources according to the schedule; and (6) responsive to discovering the target data stored on the plurality of data sources, generating and storing metadata, by the computing hardware, for each of the plurality of data sources, the metadata indicating at least one of a type of the target data, a number of instances of the target data, or a location of the target data on each of the plurality of data sources.

In some aspects, the method further comprises responsive a request to query the plurality of data sources included in the private data network via a user interface that is accessible via the public data network, facilitating, by the computing hardware, execution, by the target computing system, of processing operations or network communication for retrieving data responsive to the request from the plurality of data sources included in the private data network by: (1) accessing the metadata and identifying a subset of the plurality of data sources that store target data; and (2) facilitating, by the target computing system, execution of processing operations or network communication for retrieving the data responsive to the data subject access request on only the subset of the plurality of data sources that store target data.

In various aspects, causing the target computing system to use the computing resources available to the target computing system to scan the plurality of data sources in the private data network to discover the target data stored on the plurality of data sources according to the schedule comprises scheduling jobs to the target computing system such that executing the jobs does not cause a current resource usage at the target computing system to exceed a particular portion of the computing resource availability at the target computing system. In other aspects, causing the target computing system to use the computing resources available on the target computing system to scan the plurality of data sources in the private data network based on the target computing system resource data comprises scheduling discovery to the target computing system during at least one of a particular time period, a particular part of the day, and during a particular day. In still other aspects, causing the target computing system to use the computing resources available on the target computing system to scan the plurality of data sources in the private data network based on the target computing system resource data comprises scheduling jobs to the target computing system such that the target computing system does not execute more than a particular number of simultaneous jobs.

In some aspects, each of the plurality of jobs include causing the target computing system to classify data in the respective file as target data by: (1) tokenizing the data to generate tokenized data; (2) labeling the tokenized data to generate labelled data; and (3) classifying the data as target data based on the labelled data. In various aspects, the method further comprises generating a prediction of the type of the target data using a neural network based classification model and based on at least one of the tokenized data and the labelled data, and identifying the target data as the type of the persona data identifying based on the prediction satisfying a confidence threshold.

A method, in various aspects, comprises: (1) cataloging, by the computing hardware, data from a plurality of data sources that make up a target computing system over a private data network, the catalog identifying each file across the target computing system that requires scanning for target data; (2) creating, by the computing hardware, a plurality of jobs based on the catalog, each of the plurality of jobs corresponding to a respective file from the target computing system; (3) generating, by the computing hardware, a schedule for executing the plurality of jobs based on computing resource availability at the target computing system; (4) causing, by the computing hardware, the target computing system to use computing resources available to the target computing system to execute the plurality of jobs to scan the plurality of data sources in the private data network to discover the target data stored on the plurality of data sources according to the schedule; (5) causing, by the computing hardware, the target computing system to classify each piece of the target data according to a particular data type; and (6) responsive to discovering the target data stored on the plurality of data sources and classifying each piece of the target data according to the particular data type, generating and storing metadata, by the computing hardware, for each of the plurality of data sources, the metadata indicating at least one of the particular data type for the target data on each respective data source, a number of instances of the particular data type for the target data on each respective data source, and a location of the target data on each of the plurality of data sources.

In various aspects, classifying each piece of the target data according to the particular data type comprises: (1) causing, by the computing hardware, the target computing system to tokenize the data to generate tokenized data; (2) causing, by the computing hardware, the target computing system to label the tokenized data to generate labelled data; and (3) causing, by the computing hardware, the target computing system to classify each piece of the target data according to the particular data type based on the labelled data. In some aspects, the method further comprises: (1) causing, by the computing hardware, the target computing system to generate a prediction of a type of each piece of the target data using a neural network based classification model and based on at least one of the tokenized data and the labelled data; and (2) identifying each piece of the target data as the particular data type of the personal based on the prediction satisfying a confidence threshold. In other aspects, the method comprises: (1) causing, by the computing hardware, the target computing system to compare the particular data type of two adjacent pieces of target data in a particular document; and (2) modifying a confidence level for the prediction of at least one of the two adjacent pieces of target data.

A system, in various aspects, comprises a non-transitory computer-readable medium storing instructions; and a processing device communicatively coupled to the non-transitory computer-readable medium. In some aspects, the processing device is configured to execute the instructions and thereby perform operations comprising: (1) deploying, from a first computing system, via a public data network, a client application on a target computing system, the target computing system comprising a plurality of data sources in a private data network; (2) receiving, from the client application, at the first computing system, target computing system resource data for computing resources available to the target computing system; (3) causing, by the client application, the target computing system to use the computing resources available on the target computing system to scan the plurality of data sources in the private data network to discover target data stored on the plurality of data sources based on the target computing system resource data; and (4) causing, by the client application, the target computing system to generate an index for each respective piece of target data discovered on the plurality of data sources, the index identifying a respective file reference for each file in the plurality of data sources in which each respective piece of target data was discovered.

In some aspects, the operations further comprise: (1) providing a user interface that is accessible via the public data network and is configured for querying the plurality of data sources included in the private data network; (2) receiving, via the user interface and the public data network, a data subject access request from a client device, the data subject access request including a first piece of target data; and (3) facilitating, by the target computing system, execution of processing operations or network communication for retrieving data responsive to the data subject access request from the plurality of data sources included in the private data network by: (A) accessing the index to identify the first piece of target data; (B) identifying each respective file reference identified for the first piece of target data in the index; and (C) facilitating, by the target computing system, execution of processing operations or network communication for retrieving the data responsive to the data subject access request by limiting the processing operations or network communications for retrieving the data responsive to the data subject access requests to files on the plurality of data sources identified by each respective file reference identified for the first piece of target data in the index.

In some aspects, causing the target computing system to generate an index for each respective piece of target data discovered on the plurality of data sources occurs in response to receiving the data subject access request. In other aspects, the operations further comprise: (1) causing, by the client application, the target computing system to use the computing resources available on the target computing system to re-scan the plurality of data sources in the private data network to perform updated discovery of the target data stored on the plurality of data sources based on the target computing system resource data; (2) identifying, during the re-scan, a new instance of target data; and (3) causing, by the client application, the target computing system to modify the index to include the new instance of target data and a respective file reference for each file in the plurality of data sources in which the new piece of target data was discovered.

BRIEF DESCRIPTION OF THE DRAWINGS

In the course of this description, reference will be made to the accompanying drawings, which are not necessarily drawn to scale, and wherein.

DETAILED DESCRIPTION

Figure 1:
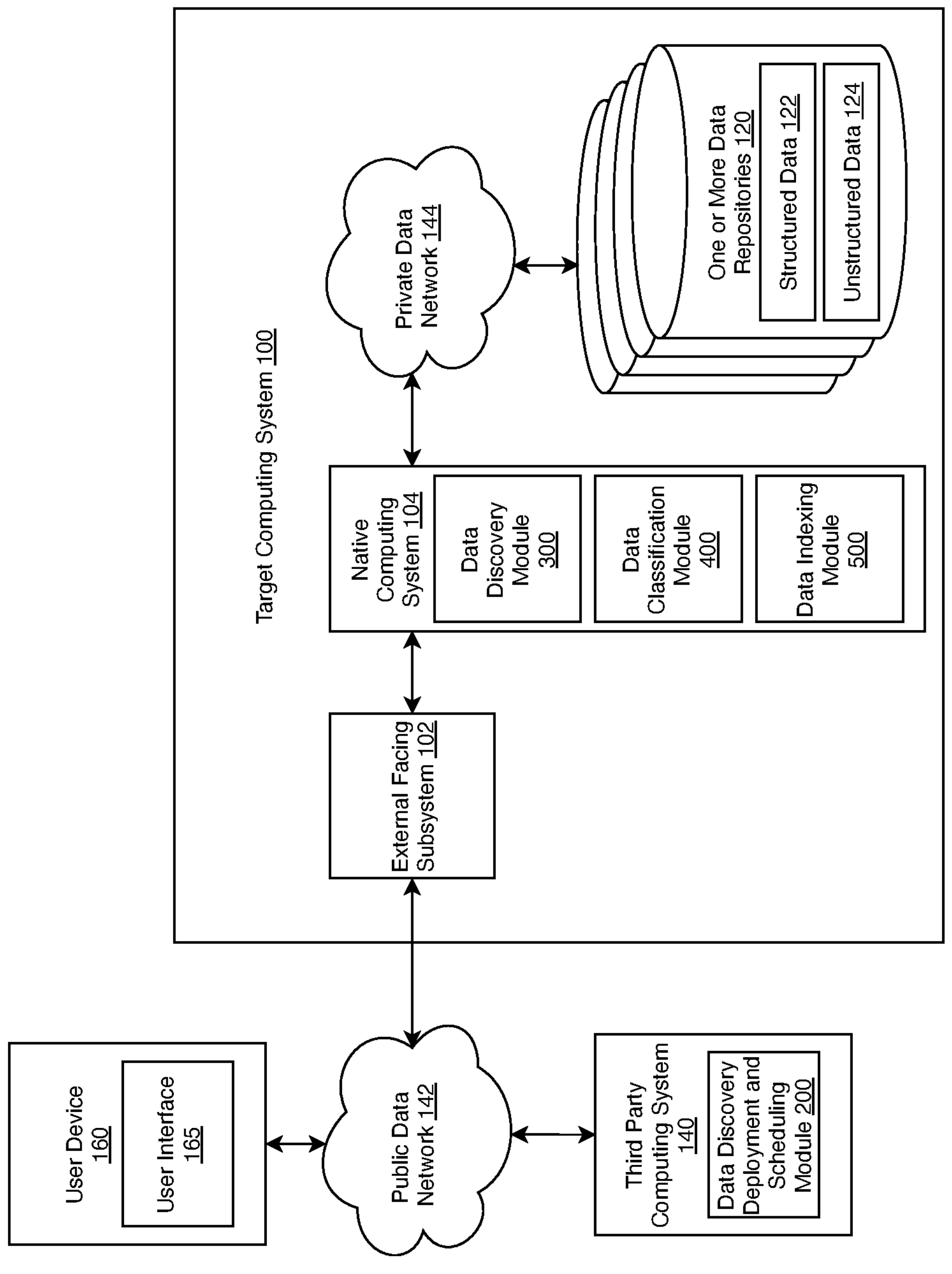
FIG. 1 depicts an example of a computing environment that can be used for discovering, classifying, and/or indexing target data stored across data assets that may be spread over one or more data repositories in a target computing system in accordance with various aspects of the present disclosure.

Overview and Technical Contributions of Various Aspects

Many entities handling (e.g., collecting, receiving, transmitting, storing, processing, sharing, and/or the like) certain types of data, which may be associated with multiple data assets found within multiple computing systems, may be tasked with performing actions on the data that involve having to locate the data over the multiple data assets. A particular technical challenge related to performing these actions on the data includes identifying each instance of data across the multiple data assets and computing systems, and then determining which of those instances of data include particular target data related to the action to be performed.

Additionally, the cost of performing computations necessary to scan a large number of data assets and other data repositories may increase as the number of data assets and other computing systems on which the personally identifiable information or other target data may reside increases. An additional technical challenge related to discovering particular data across multiple data assets, computing systems, etc. may include risks related to transferring data out of a source or target data asset or other computing system for the purpose of scanning and analyzing that data in order to process such requests. For example, transferring data between computing systems (e.g., from a target computing system to a second system for the purposes of analyzing data from the target system) can expose the data to a signification risk of experiencing some type of data incident involving the data, such as a data breach leading to the unauthorized access of the data, a data loss event, etc. As such, it may be technically difficult to discover particular data on a target computing system without increasing the risk of such exposure.

As the quantity of data increases over time, and/or as the number of data assets and computing systems that may be potentially handling the data increases, determining where particular data has been stored (e.g., collected, received, transmitted, processed, shared, and/or the like) across all of the potential data assets, computing systems, data processing activities, and/or the like can be difficult. Additionally, discovering particular data (e.g., target data) across multiple data assets, computing systems, and/or the like may become even more challenging when each of the data assets, systems, data processing activities, and/or the like use their own, possibly unique, process or format for storing data. That is to say, where different file formats, attributes, procedures, techniques, and/or the like of storing target data are used across multiple computing systems, data sources, and/or the like, locating specific data, especially specific target data associated with a particular individual, may not be feasible by simply using a common mechanism for all the different systems.

Additionally, providing data responsive to one or more queries related to that data (e.g., when an individual entitled to the data responsive to the one or more queries submits such a query) may be technically challenging when processing the one or more queries in a tight timeline. These challenges may be amplified when an entity receives a large number of such queries from a large number of different data subjects, each of which may require discovering entirely different instances of data (e.g., data associated with each respective data subject for each respective query) across each of the systems, data sources, etc.

Accordingly, various aspects of the present disclosure overcome many of the technical challenges mentioned above using available (e.g., unused) computing resources on existing computing systems to perform data discovery computations on data stored on those existing computing systems, thereby reducing computing infrastructure footprint required to process data subject access requests. For example, according to particular aspects, a third-party computing system may connect, via a public data network, to an edge node inside a cluster network zone and schedule jobs to that cluster, harnessing existing computing power in the cluster network zone. In various aspects, by causing computing hardware that is native to a target computing system to perform operations to discover target data on the target computing system, the system may reduce infrastructure footprint, schedule jobs to the target computing system rather than transferring data out of the target computing system for computation purposes (e.g., thereby reducing cost, increasing performance, and minimizing or eliminating extra-system data transfers), and/or maintain data in the target computing system thus in same secure network zone, thereby reducing a chance of exposing the data to a significant risk of experiencing some type of data incident involving the data that may occur when transferring data out of the secure network zone of the target computing system.

More particularly, in order to reduce infrastructure footprint and schedule jobs to the target computing system, a third-party computing system (e.g., a data discovery system) may deploy a client application to a target computing system via a public data network. In some aspects, by deploying the client application to the target computing system (e.g., and using the client application to direct the target computing system to perform the operations), additional computing infrastructure may not be required to perform the data discovery process described herein (e.g., beyond the existing computing infrastructure that makes up the target computing system), thereby reducing the infrastructure footprint required to perform data discovery on the target computing system and the costs associated with acquiring and utilizing additional computing resources.

The target computing system may include data sources in a private data network, with the data sources storing target data. The third-party computing system may receive, from the client application, computing system resource data for the target computing system that is available on the target computing system. For example, the computing system resource data may include data describing the capacity or availability of any resource provided by one or more components of the target computing system. For instance, the computing system resource data includes data related to current resource usage, total available resources (e.g., total available resources across the target computing system, total available resources that are earmarked for use for data discovery processes, etc.). The third-party computing system may then cause the target computing system (e.g., instruct the target computing system) to scan the data sources in the private data network to discover target data stored on the data sources based on the computing system resource data. For example, the third party computing system can schedule the jobs based on the computing system resource data by determining a current resource usage by the target computing system and scheduling the jobs such that the total resources used by the scheduled jobs do not cause the target computing system to exceed the total available resources. In other aspects the third party computing system may schedule jobs to the target computing system according to any suitable schedule (e.g., at a particular time, during a particular day of the week, during a particular time period, during a particular part of the day, etc.), such as to avoid the target computing system executing jobs during peak processing times.

The third-party computing system and/or the target computing system may then generate and store metadata for each of the data sources that indicates, for example, a type of identified data, a location of the identified data, and/or an amount of the identified data at the location. The third-party computing system and/or the target computing system may then access and use the metadata when processing a query regarding target data for a particular individual (e.g., by limiting a search for the particular individual's particular data to computing systems, data assets, etc. on which the native computing system has previously identified storage locations that include target data).

It is noted that reference is made to target data throughout the remainder of the application. In various aspects, target data may include any data that is the target of the data discovery processes described herein (i.e., any data or type of data on the target computing system that the data discovery process is configured to discover). Target data may include, for example, personal or sensitive data (e.g., first and last name, email address, home address, social security number, date of birth, financial information, etc.) or other controlled data. However, targeted data is not necessarily limited to information that may be configured as personal and/or sensitive in nature but may also include other forms of data. For example, target data may include data that relates to an entity's business, operational procedures, legal obligations, and/or the like may need to be discovered for any reason. Further, targeted data may not necessarily be associated with an individual but may be associated with other entities such as a business, organization, government, association, and/or the like.

Example Computing Environment

FIG. 1 depicts an example of a computing environment that can be used for discovering, classifying, and/or indexing target data stored across data assets that may be spread over one or more data repositories in a target computing system according to various aspects. For example, a data asset may be a sub-system, software application, website, mobile application, data storage/repository, external system, and/or the like. A target computing system may, for example, store target data across computing systems in different locations in those computing systems. As discussed herein, an entity that collects, processes, accesses, stores, retrieves, deletes, or otherwise handles target data may be required to provide data responsive to one or more queries related to that data (e.g., when an individual entitled to the data responsive to the one or more queries submits such a query).

FIG. 1 depicts examples of hardware components of a target computing system 100 according to some aspects. In various aspects, the target computing system 100 may include any computing system 100 on which target data is stored for which the target computing system may receive one or more queries. The target computing system 100 is a specialized computing system that may be used for processing large amount of data using a large number of computer processing cycles. In various aspects, the target computing system 100 includes a specialized computing system that may be used for processing the large amount of data according to a job schedule determined based on computing system resource data (e.g., computing resource availability). In some aspects, the job schedule may enable the target computing system 100 to leverage available (e.g., unused) computing resources of the target computing system 100 while reducing a taxation of the computing resources by the target computing system 100.

The target computing system 100 may communicate with various computing systems, such as a user device 160. In various aspects, the target computing system 100 may receive one or more queries via a user interface 165 from the user device 160. For instance, many organizations provide a publicly accessible interface through which data subjects (or lawful representatives thereof) can submit requests (e.g., data subject access requests) related to their target data being processed by the organizations. For example, many organizations provide a website or software application that is accessible by data subjects over a public data network 142 such as the Internet, or through a publicly available application. Here, the website may include a web form that can be used by the data subjects to submit requests related to the data subjects' target data being processed by the organizations. Therefore, a data subject wishing to exercise their rights can simply visit an organization's website and use the webform to submit a data subject access request that includes a request related to a target data right that the organization must fulfil in a timely manner (e.g., a request for the target computing system 100 to provide data responsive to the request). Since the interface (e.g., website) is often publicly available, an organization can receive a considerable number of requests at any given time that then requires the organization to devote a significant number of computing resources to timely fulfill the requests. This can become even more of a substantial challenge as target data collected, stored, or otherwise processed by an organization increases in volume and/or is collected, stored, or otherwise processed over an increasing number of data sources involving multiple data storage systems that are in communication over one or more private data networks 144.

The target computing system 100 may further communicate with various other computing systems, such as a third-party computing system 140. For example, the third-party computing system 140 may send data to the target computing system 100 for processing or may send signals to a native computing system 104 at the target computing system 100 to control or influence operations of different aspects of the target computing system 100. For example, the third-party computing system 140 may deploy a client application to the native computing system 104 for execution by the native computing system 104. In various aspects, the native computing system 104 includes any computing system on the private data network 144. The client application may cause the native computing system 104 to execute processing operations related to discovering, classifying, and/or indexing data on the target computing system 100 (e.g., using computing resources available at the target computing system 100).

The third-party computing system 140 may interact, via one or more public data networks 142, with various external-facing subsystems 102 of the target computing system 100. Each of the various external-facing subsystems 102 may include one or more computing devices that provide a physical subnetwork that exposes certain online functions of the target computing system 100 to an untrusted network, such as the internet or another public data network 142. In various aspects, the various external-facing subsystems 102 may provide an interface between the public data network 142, operating as edge nodes in a cluster computing system used by the target computing system 100. In various aspects, the various external-facing subsystems 102 are in communication with the native computing system 104 (e.g., via one or more firewalls) and may, for example, be connected to one or more other computing systems within the target computing system 100 via a private data network 144. In some aspects, by using the private data network 144, the target computing system 100 may house one or more data repositories 120 that are not directly accessible via the public data network 142 (e.g., the Internet). In this way, the target computing system 100 may maintain data stored in the data repositories 120 in the private data network 144, and perform data discovery and other operations on the data, without having to transfer this data out of the target computing system 100 (e.g., to the third-party computing system 140) for analysis, processing, etc.

In some aspects, the third-party computing system 140 can include one or more third-party devices such as, for example, one or more servers operating in a distributed manner. The third-party computing system 140 can include any computing device or group of computing devices, and/or one or more server devices. The third-party computing system may include computing hardware performing different processes for deploying one or more client applications on the target computing system 100, and scheduling jobs to the target computing system 100 for using target computing system 100 resources to discover target data on the target computing system 100. For instance, the third-party computing system 140 executes a data discovery deployment and scheduling module 200 to schedule jobs to the native computing system 104.

The data discovery deployment and scheduling module 200 can deploy a client application on the native computing system 104 for scheduling discovery jobs on the native computing system 104. The third-party computing system 140 (e.g., when executing steps related to the data discovery deployment and scheduling module 200) receives computing resource data and job data from the native computing system 104 (e.g., via the client application over the public data network 142). The third-party computing system 140 uses the resource data and the job data to schedule jobs to the native computing system 104 (e.g., by optimizing computing resource use by the native computing system 104 during the discovery of target data on the target computing system 100).

The data repositories 120 may store structured data 122 and unstructured data 124. In some aspects, unstructured data may include data (e.g., stored in one or more documents, files, etc. of any type) that may include target data in a format other than a predefined or readily identifiable format. In various aspects, discovering, classifying, and indexing target data contained in unstructured data sources may provide an additional technical challenge (i.e., because the native computing system 104 may need to classify the data in the unstructured data sources prior to indexing it). Although the data repositories 120 are shown as separate components, these components 120 may include, in other aspects, a single server and/or repository, servers and/or repositories, one or more cloud-based servers and/or repositories, or any other suitable configuration.

According to various aspects, the target computing system 100 may include computing hardware performing a number of different processes in discovering data (e.g., target data), classifying the data, and indexing the data. Specifically, according to particular aspects, the native computing system 104 executes: (1) a data discovery module 300 to perform data discovery on the target computing system 100; (2) a data classification module 400 to classify data (e.g., by type) discovered on the target computing system; and/or (3) a data indexing module 500 to index the discovered, classified data.

The native computing system 104 (e.g., or other suitable system) may execute the data discovery module 300 to perform operations including initiating a data discovery scan across the target computing system 100 by: (1) cataloging data across the target computing system 100; (2) creating jobs based on the catalog; (3) performing data discovery based on a job schedule; and (4) generating and storing metadata regarding target data discovered on the target computing system 100. The metadata may include, for example, a type of identified data, a location of the identified data, an amount of the identified data at the location, etc.

The native computing system 104 or other suitable system may execute the data classification module 400 to perform operations including classifying data (e.g., as a particular type of target data) by: (1) executing one or more contextual analysis actions on data (e.g., and/or one or more schema associated with the data; (2) executing one or more advanced tokenization steps on the data; (3) executing one or more labeler steps on the data; (4) executing a confidence workflow on the tokenized, labelled data; and (5) executing one or more steps including applying an aggregate level reconciler to the data. These operations may vary, for example, based on whether a particular data source includes structured or unstructured data.

The native computing system 104 (e.g., or other suitable system) may execute the data indexing module 500 to perform operations including generating an index of data in unstructured documents and generating and storing metadata for the unstructured documents indicating an occurrence of a particular piece of target data in the unstructured documents.

The number of devices depicted in FIG. 1 are provided for illustrative purposes. It should be understood that, in some aspects, different number of devices may be used. In various aspects, for example, while certain devices or systems are shown as single devices in FIG. 1, multiple devices may instead be used to implement these devices or systems.

Data Discovery Deployment and Scheduling Module

Figure 2:
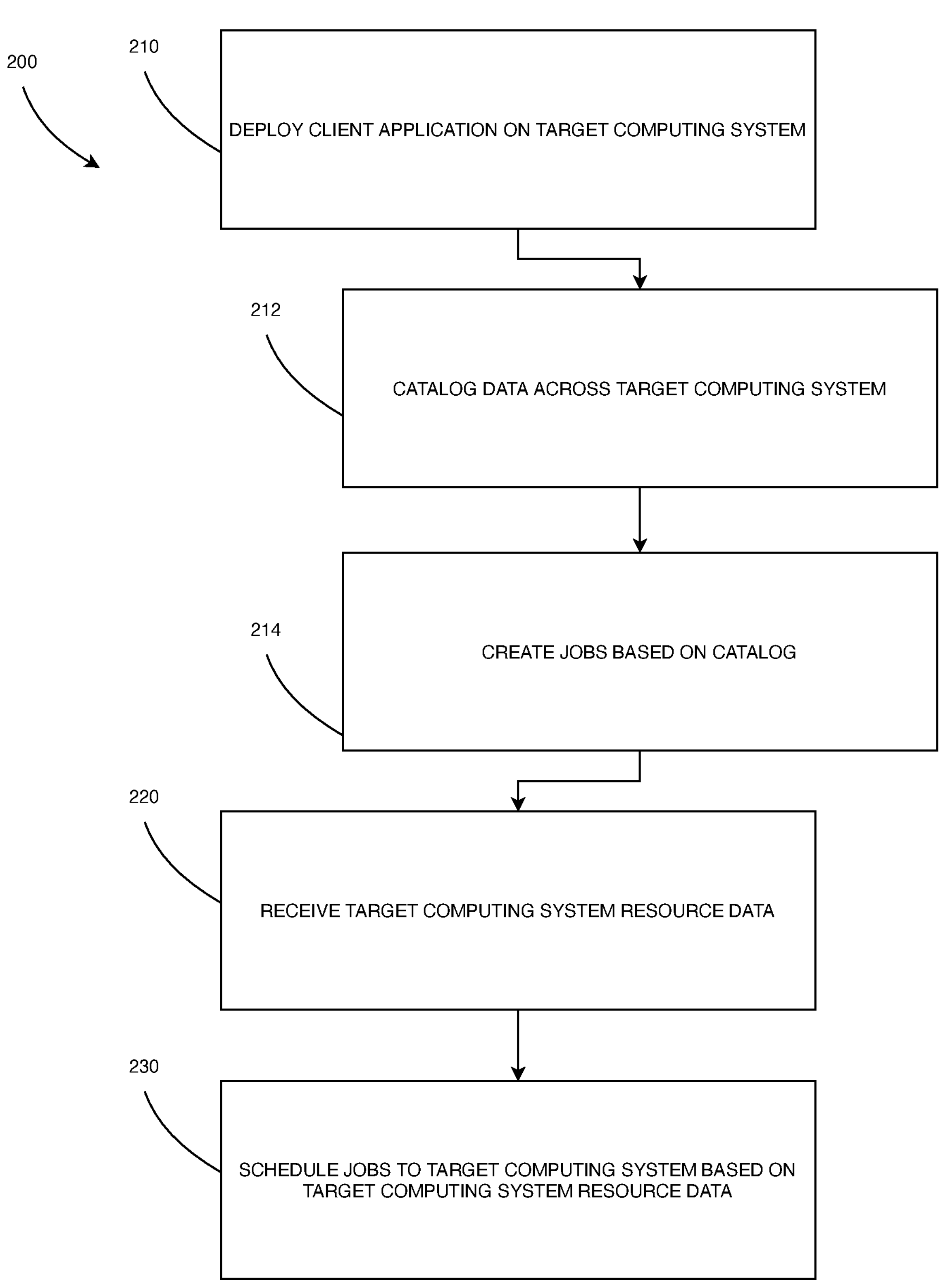
FIG. 2 depicts an example of a process for deploying a client application in a target computing system for facilitating and scheduling data discovery on the target computing system in accordance with various aspects of the present disclosure.

FIG. 2 depicts an example of process performed by a data discovery deployment and scheduling module 200. This process include operations that the third-party computing system 140 may execute to deploy a client application on the target computing system 100 (e.g., the native computing system 104) for scheduling discovery jobs on the native computing system 104. For instance, the flow diagram shown in FIG. 2 may correspond to operations carried out, for example, by computing hardware found in the third-party computing system 140 as the computing hardware executes the data discovery deployment and scheduling module 200.

In various aspects, the third-party computing system 140 (e.g., when executing steps related to the data discovery deployment and scheduling module 200) receives computing resource data and job data from the native computing system 104 (e.g., via the client application over the public data network 142) and uses the resource data and the job data to schedule jobs to the native computing system 104 (e.g., by optimizing computing resources used by the native computing system 104 to discover target data on the target computing system 100).

At operation 210, the data discovery deployment and scheduling module 200 deploys a client application on the native computing system 104. In various aspects, the client application may execute on the native computing system 104 and, for example, execute one or more operations included in the data discovery module 300, the data classification module 400, and the data indexing module 500 discussed more fully below.

In still other aspects, the client application communicates information and/or instructions with the third-party computing system 140 (e.g., via the public data network 142 between the third-party computing system 140 and the native computing system 104).

At operation 212, the data discovery deployment and scheduling module 200 catalogs data across the target computing system 100. In various aspects, cataloging the data across the target computing system 100 includes identifying each file stored across the target computing system 100. Such files may include target data such that each file needs to be scanned to identify target data as part of the data discovery process. In some aspects, cataloging the data may involve identifying, for each identified file, data related to a file type, file format, etc. In other aspects, cataloging the data includes identifying and cataloging each data storage location across the target computing system 100 (e.g., cluster computing system). In various aspects, initiating the scan of the target computing system 100 begins with cataloging the data across the target computing system because the data on the target computing system 100 may change, expand, contract, etc. frequently as the target computing system 100 stores new data, moves data within the system, etc. As such, it may be desirable to begin a fresh data discovery process with a fresh data catalog. In some aspects, the third-party computing system 140 may catalog data from the target computing system as part of the data discovery process on the target computing system 100. In some aspects, as discussed below with respect to the data discovery module 30), the target computing system 100 (e.g., in conjunction with and/or instead of the third-party computing system 140, etc.) may catalog the data on the target computing system 100 for use in scheduling jobs to the target computing system 100.

At operation 214, the data discovery deployment and scheduling module 200 creates jobs based on the catalog. For instance, the third-party computing system 140 generates job data that includes identified and/or created jobs that must be executed in order to perform data discovery on the target computing system 100. The third-party computing system 140 may create a job for each file identified in the catalog. The third-party computing system 140 may, for example, create each job based on a file type or file format of the associated file. Each job may, for example, include a particular script for execution by a system (e.g., by the native computing system 104). In various aspects, the created jobs may include one or more classification or indexing steps discussed herein. In this way, the third-party computing system 140 may generate a set of jobs that, when executed (e.g., by the native computing system 104), cause the native computing system 104 to perform the data discovery process discussed herein across the entire catalog.

Continuing to operation 220, the data discovery deployment and scheduling module 200 receives target computing system resource data from the native computing system 104 in the target computing system 100. The computing system resource data may include data describing the capacity or availability of any resource provided by one or more components of the target computing system. For instance, the computing system resource data includes data related to current resource usage, total available resources (e.g., total available resources across the target computing system 100, total available resources that are earmarked for use for data discovery processes, etc.).

At operation 230, the third-party computing system 140 schedules jobs to the native computing system 104 based on the target computing system resource data. For example, the third-party computing system 140 may transmit instructions to the native computing system 104 (e.g., to the client application executing on the native computing system 104) to execute each identified job according to a determined schedule. Scheduling the jobs based on the target computing system resource data may include, for example determining a current and/or future computing resource availability based on the current usage and the total available computing resources and scheduling the jobs such that the total resources used by the scheduled jobs do not exceed the current and/or future computing resources availability. In a particular example, the third-party computing system 140 may schedule jobs such that the native computing system 104 does not execute more than a particular number of jobs simultaneously. In another example, the third-party computing system 140 may schedule jobs such that native computing system resource use by data discovery processes does not exceed a particular portion of the total available resources at the target computing system 100.

In other aspects, the third-party computing system 140 schedules jobs to the target computing system 100 according to any suitable schedule (e.g., at a particular time, during a particular day of the week, during a particular time period, during a particular part of the day, etc.) As such, the third-party computing system 140 may schedule jobs on the target computing system 100 such that a number of simultaneous jobs executed by the target computing system 100 varies based on the currently available computing resources.

In one example involving a cluster computing system, the third-party computing system 140 schedules jobs on the native cluster (e.g., at the target computing system 100) based on the resource availability of that system. For instance, the third-party computing system 140 could query a Yarn Job manager to see the resource availability for a given Yarn Queue or Queues and then, based on a threshold, start a job or waits for the necessary resources to open up prior to starting a job. The third-party computing system 140 can schedule one or more jobs at the native cluster on the target computing system 100 based on a maximum parallel number of jobs. For example, at any given time the third-party computing system 140 can run not more than N jobs (e.g., any suitable number N) simultaneously on the cluster computing system.

In this way, the third-party computing system 140 may direct the target computing system 100 (e.g., the native computing system 104) to leverage available (e.g., unused) computing resources of the target computing system 100 for data discovery processes, without overtaxing those computing resources.

For illustrative purposes, the data discovery deployment and scheduling module 200 is described with reference to implementations described above with respect to one or more examples described herein. Other implementations, however, are possible. In some aspects, the steps in FIG. 2 may be implemented in program code that is executed by one or more computing devices such as the third-party computing system 140, the native computing system 104, or other system in FIG. 1. In some aspects, one or more operations shown in FIG. 2 may be omitted or performed in a different order. Similarly, additional operations not shown in FIG. 2 may be performed.

Data Discovery Module

Figure 3:
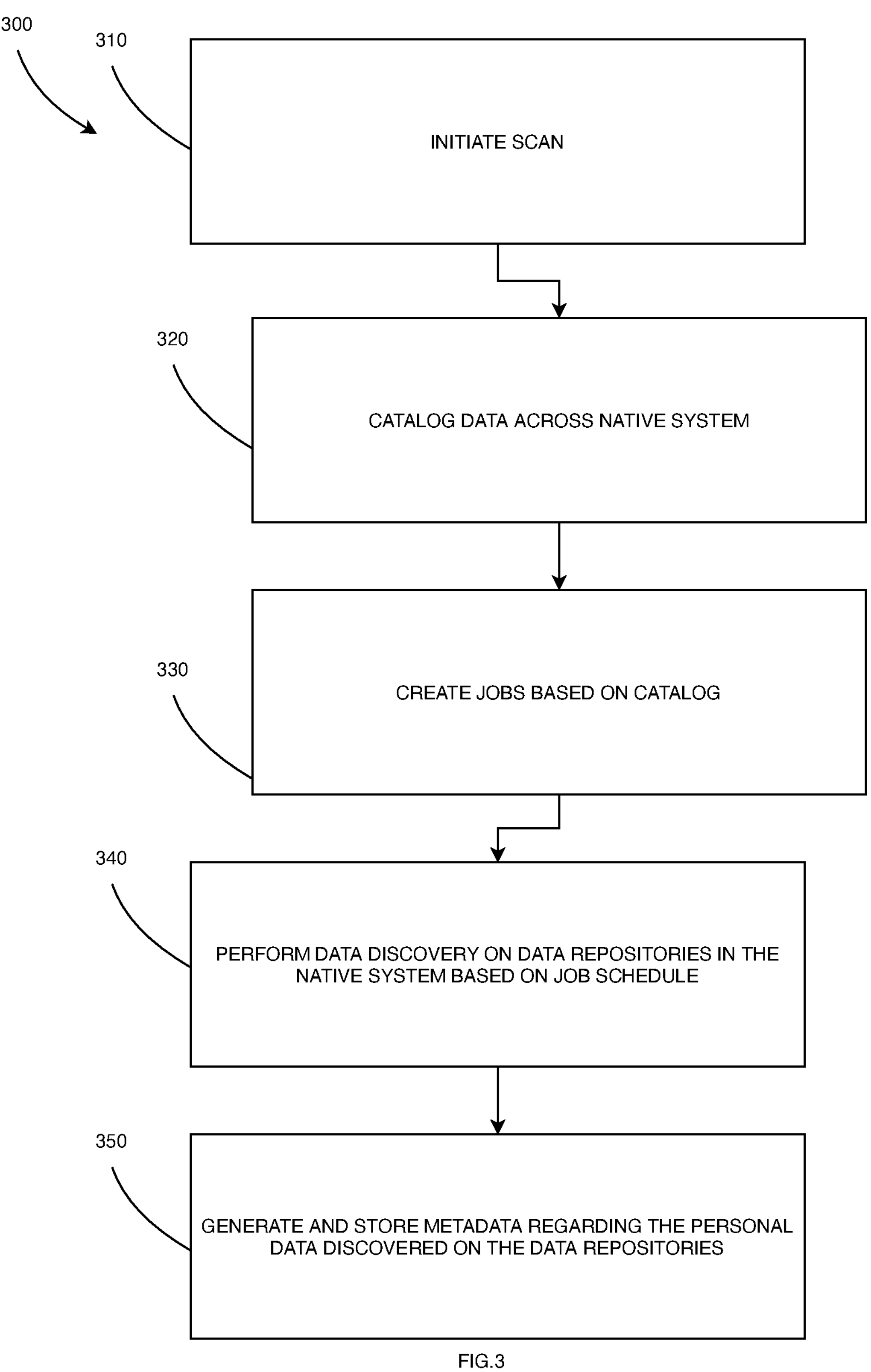
FIG. 3 depicts an example of a process for discovering target data on a target computing system in accordance with various aspects of the present disclosure.

FIG. 3 depicts an example of a process performed by a data discovery module 300. This process may, for example, include operations that the native computing system 104 may execute to initiate a data discovery scan across the target computing system 100 by: (1) cataloging data across the target computing system 100; (2) creating jobs based on the catalog; (3) performing data discovery based on a job schedule; and (4) generating and storing metadata regarding target data discovered on the target computing system 100. For instance, the flow diagram shown in FIG. 3 may correspond to operations performed by computing hardware found in the native computing system 104 that executes the data discovery module 300.

At operation 310, the data discovery module 300 initiates a scan of the target computing system 100. In various aspects, the native computing system 104 initiates the scan of the target computing system 100 to discover target data stored across data assets within different data repositories 120 in the target computing system 100. The target computing system 100 may, for example, store target data across computing systems (e.g., in the native computing system 104) in different locations in those computing systems (e.g., on one or more of the data repositories 120, or in any other suitable location on the target computing system 100).

In operation 320, the data discovery deployment module 300 catalogs data across the target computing system 100. Cataloging the data across the target computing system 100 can include identifying each file stored across the target computing system 100. These files may include target data such that each file needs to be scanned to identify target data as part of the data discovery process. Cataloging the target computing system 100 can also include identifying and cataloging each data storage location across the target computing system 100 (e.g., cluster computing system). In various aspects, initiating the scan of the target computing system 100 begins with cataloging the data across the target computing system because the data on the target computing system 100 may change, expand, contract, etc. frequently as the target computing system 100 stores new data, moves data within the system, etc. As such, it may be desirable to begin a fresh data discovery process with a fresh data catalog. In some aspects, the third-party computing system 140 may catalog the target computing system as part of the data discovery process on the target computing system 100.

At operation 330, the data discovery deployment module 300 creates jobs based on the catalog. The native computing system 104 generates job data that includes identified and/or created jobs that must be executed in order to perform data discovery on the target computing system 100. When creating jobs, the native computing system 104 may create a job for each file identified in the catalog. For instance, the third native computing system 104 may create each job based on a file type or file format of the associated file. Each job may include a particular script for execution by the native computing system 104. In this way, the native computing system 104 may generate a set of jobs that, when executed (e.g., by the native computing system 104), cause the native computing system 104 to perform the data discovery discuss herein across the entire catalog. In some aspects, the native computing system 104 may generate jobs that include the jobs generated by the third party computing system 140 (e.g., discussed with respect to operation 230 in FIG. 2). In other aspects, the native computing system 104 may generate jobs to supplement jobs generated by the third party computing system 140 (e.g., discussed with respect to operation 230 in FIG. 2). In still other aspects (e.g., aspects in which the third party computing system omits a job creating step at operation 230 of FIG. 2), the native computing system 104 may create jobs based on the catalog in lieu of the third party computing system 140 creating the jobs.

At operation 340, the data discovery deployment module 300 performs data discovery on the data repositories 120 based on a job schedule. In some aspects, the native computing system 104 receives the job schedule from the third-party computing system 140 (e.g., the job schedule described with respect to the data discovery deployment and scheduling module 200 in FIG. 2). In additional or alternative aspects, the native computing system 104 may generate the job schedule. When performing the data discovery on the data repositories 120 (e.g., on the target computing system 100) based on the job schedule, the native computing system 104 may execute one or more scripts associated with each job according to the schedule. A timing of execution of each job may vary based on current resource availability, time, or any other suitable factor.

At operations 350, the data discovery deployment module 300 generates and stores metadata regarding the target data discovered on one or more of the data repositories 120. The metadata includes, for example, a type of identified data, a location of the identified data, an amount of the identified data at the location, etc. The third-party computing system 140 and/or the native computing system 104 may then access the metadata when processing a query regarding target data for a particular individual (e.g., by limiting a search for the particular individual's particular data to computing systems, data assets, etc. which the native computing system 104 has identified as storage locations that include target data).

In this way, the process may identify locations on the target computing system 100 that include target data (e.g., which may be relevant to such queries) without transferring any of the actual data out of the target computing system. By only transferring or making available metadata relating to the discovered data (e.g., the location of the data, the type of data at the location, etc.) as opposed to the data itself, the process may alleviate technical problems that arise from transferring data out of a source data asset or other computing system for the purpose of scanning and analyzing that data in order to process data subject access requests and other queries (e.g., by avoiding triggering regulations related to such transfers).

For illustrative purposes, the data discovery module 300 is described with reference to implementations described above with respect to one or more examples described herein. Other implementations, however, are possible. In some aspects, the steps in FIG. 3 may be implemented in program code that is executed by one or more computing devices such as the target computing system 100, the native computing system 104, or other system in FIG. 1. In some aspects, one or more operations shown in FIG. 3 may be omitted or performed in a different order. Similarly, additional operations not shown in FIG. 3 may be performed.

Data Classification Module

Figure 4:
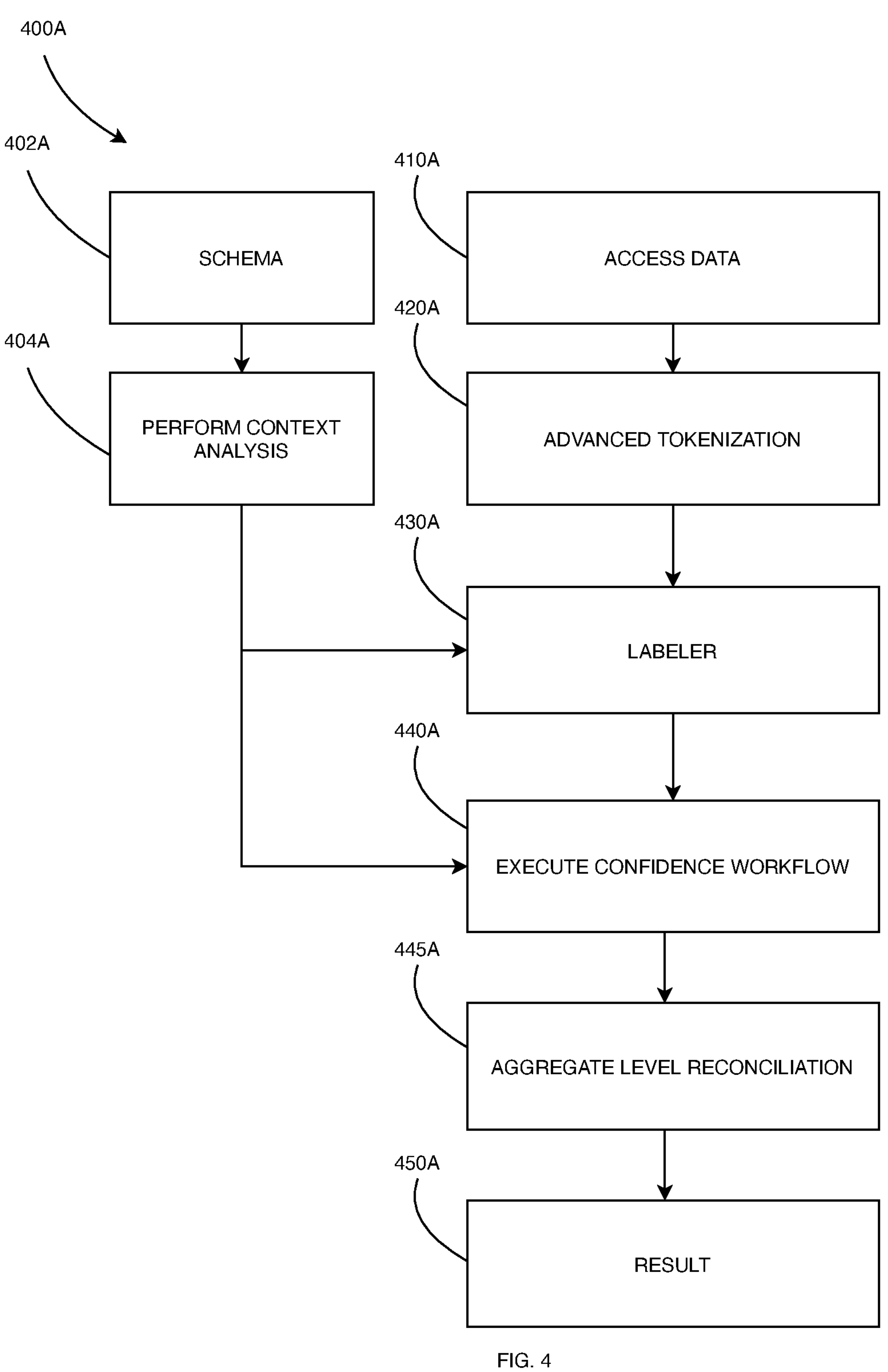
FIG. 4 depicts an example of a process for classifying data discovered on a target computing system in accordance with various aspects of the present disclosure.
Figure 5:
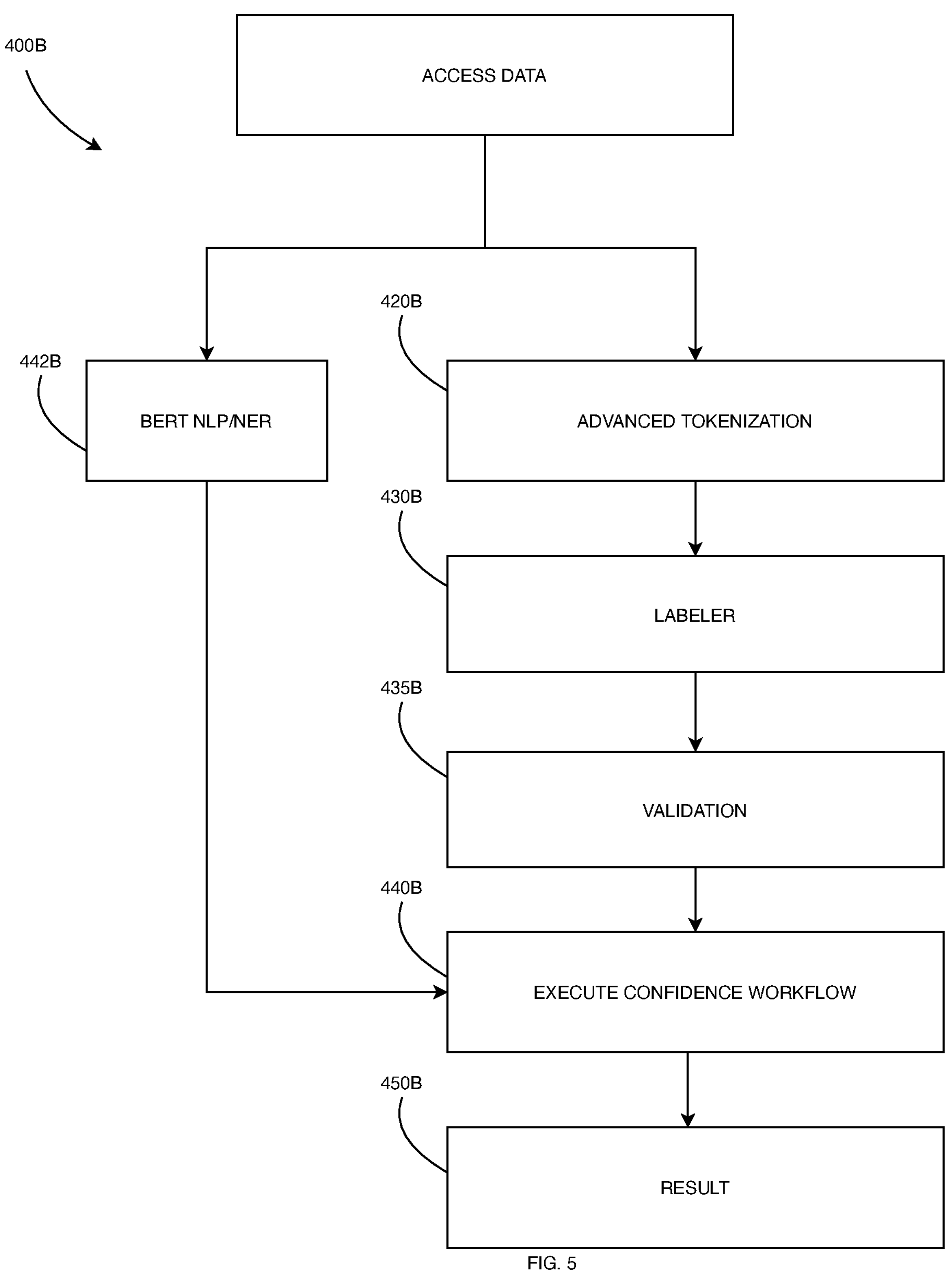
FIG. 5 depicts an example of a process for classifying data discovered on a target computing system in accordance with yet another aspect of the present disclosure.

FIGS. 4 and 5 are flow charts depicting examples of processes performed by a data classification module 400 module according to various aspects. A data discovery process described herein involves identifying target data in a target computing system 100. When scanning a target computing system 100 for target data, the process may involve classifying identified data (e.g., based on data type) in order to determine whether particular data in a document, on a data store, etc. includes target data. For example, a nine digit number may represent any suitable type of data (e.g., a page view count for a web page, a filename, etc.). In some instances, a nine digit number may represent a social security number, which would fall in the category of target data. The processes depicted in FIGS. 4 and 5 may include operations related to classifying data (e.g., as a particular type of target data) by: (1) executing one or more contextual analysis actions on data (e.g., and/or one or more schema associated with the data; (2) executing one or more advanced tokenization steps on the data; (3) executing one or more labeler steps on the data; (4) executing a confidence workflow on the tokenized, labelled data; and (5) executing one or more steps including applying an aggregate level reconciler to the data. In some aspects, the steps of the process may vary, for example, based on whether a particular data source includes structured or unstructured data.

FIG. 4 depicts an example of a process 401 performed by a data classification module 400 for classifying structured data during a data discovery process are shown. For instance, operations depicted in FIG. 4 can be performed by computing hardware found in the native computing system 104 (e.g., or other computing system) as described herein 401 (e.g., in conjunction with executing the data discovery module 300).

At operation 410A, the native computing system 104 accesses data. In various aspects, that native computing system 104 may access a data set (e.g., on one or more of the data repositories 120) as the native computing system 104 performs data discovery on the target computing system 100. In some aspects, the data may include any suitable data format (e.g., such as a table, string, email, document, etc.).

At operation 420A, the native computing system 104 tokenizes the data set. In various aspects, the native computing system 104 may tokenize the dataset by separating the text found in the dataset (e.g., in one or more data elements that make up the data set) into tokens, i.e., smaller units (e.g., words, characters, sub-words, and/or the like). The tokenized data may be utilized in the labelling process described herein.

At operation 402A, the native computing system 104 reads the schema for the data to determine the structure of the data (e.g., column headings, data configuration, etc.). The schema for the data can include a structure or organization of the data. The schema may define relationships between one or more data elements that make up the data. The schema may, for example, define labels for data in a particular column or row of a table. The native computing system 104, at operation 404A then performs context analysis on the schema. In one example, the native computing system 104 system performs a context analysis by using one or more fuzzy matchers and/or machine-learning based classifiers to identify a particular schema category and/or label for the data (e.g., which may include a data type). For instance, in the context of a structured data set, the native computing system 104 may apply a fuzzy matcher to identify data labels based on any suitable fuzzy matching threshold. The native computing system 104 may further use the machine learning based classifier to categorize one or more pieces of data in the data set. Examples of suitable machine learning classifiers include: (1) one or more linear classifiers; (2) one or more nearest neighbor classifiers; (3) one or more support vector machines; (4) one or more decision trees; (5) one or more boosted tress; (6) one or more random forests; (7) one or more neural networks; and/or (8) any other suitable machine learning based classification technique. In some aspects, the native computing system 104 uses one or more neural network machine-learning based classification models to perform character embedding and feature extraction processes. For instance, the system may use a lm_lb language model. The native computing system 104 may use the neural network model to train and make a prediction related to the context analysis. The prediction may include a prediction of a data type associated with a particular label in the schema and may include a confidence level for the prediction. In some aspects, the native computing system 104 evaluates an output from the fuzzy matcher and machine learning based calculator to assign a determined data label for one or more data elements as either the output from the fuzzy matcher or the output from the machine learning based calculator. (e.g., by assigning the output from whichever of the fuzzy matcher and the machine learning based calculator generated the prediction with the highest confidence).

Returning to operation 430A, the native computing system 104 labels the tokenized data. For instance, the native computing system 104 labels various data elements in the data based on an identified type of the target data in each data element. In some aspects, the native computing system 104 may use the results of the context analysis to improve the computation performance of the labeler. For example, the native computing system 104 may limit potential labels for data to the predicted labels (e.g., data types) generated through the machine learning based calculator and/or the fuzzy matcher). In various aspects, the native computing system 104, when labelling the data, uses one or more predicate chains in the labelling process. For example, when using predicate chains, the native computing system 104 utilizes predicates as a predictive tool to eliminate different labels (e.g., categories) as potential labels for the tokenized data. The native computing system 104 progresses through the predicate chain until the native computing system 104 identifies the label for the data. For example, a phone number may include a three digit area code followed by a seven digit number. When progressing through a predicate chain for a particular piece of data, the native computing system 104 may apply a predicate to determine whether the data may be properly labelled as a phone number by determining whether the tokenized data begins with a three digit number. The native computing system 104 may chain and apply other predicates to the date eliminate other potential data labels prior to finalizing a label. For example, other data types may also include data that begins with three digits (e.g., such as an e-mail address, employee ID number, SSN, credit card number etc.). In order to use predicate chains to assign a label of 'phone number' to a piece of data that begins with a three digit number, the native computing system 104 may chain together and progress through additional predicates to eliminate other potential labels that would also begin with a three digit number (e.g., a predicate to identify an (@) in the data to eliminate e-mail addresses beginning with three digits).

In various aspects, the native computing system 104 may utilize predicates such as, for example: (1) one or more mask predicates, which may, for example determine whether a particular chain should continue executing and make one or more N-gram determinations; (2) one or more label predicates, which may, for example, include fuzzy matching, regular expressions, look up, and one or more entity identifications based on a named-entity recognition model; (3) one or more windowing predicates, which may, for example, identify one or more child labels in a given label, identify user names and passwords, adult content, or other sensitive information in one or more URLs; (4) one or more custom predicates, which may, for example, support domain-specific labelling scenarios; and/or (5) any other suitable labelling predicate or combination of predicates.

At operation 440A, the native computing system 104 executes a confidence workflow on the tokenized, labelled data. For example, the native computing system 104 may use any validator and/or context analysis discussed herein to compute a confidence of a determined label. In various aspects, the one or more validators may include, for example: (1) one or more Luhn validators to check for credit card or other numbers; (2) one or more Modulus checks to check for social security numbers, social insurance numbers, etc.; (3) and/or any other custom domain value check. The native computing system 104 may determine a confidence level for a predicted label (e.g., using a neural network based classification model). The native computing system 104 may apply a label to a particular data element in response to determining that the confidence level exceeds a particular threshold.

In the context of a structured data classification, at operation 445A, the native computing system may apply one or more aggregate level reconcilers to the analyzed data. In various aspects, the native computing system 104 can compute label distribution statistics for a given column in a data set and weed out false positive matches. For example, in a particular column, the native computing system may generate a label prediction for each data element in the column as a first name. The native computing system 104 may further generate a label prediction of country name for a particular data element in the column that includes the word "China." In this example, the native computing system 104 may modify the false positive label by reclassifying the label prediction for "China" to "first name." In some aspects, the native computing system 104 may reconcile conflicts in labels for adjacent data (e.g., data in a single column of a table, row of a table, etc.) based on one or more variables such as, for example, confidence score, number of occurrences, etc. For example, the native computing system 104 can assign a respective label to a plurality of pieces of adjacent data (e.g., data in a particular column). The native computing system 104 can then compare the respective labels for the adjacent data to identify differences in the labelling. In one example, if the native computing system 104 assigns a first label to nine out of ten pieces of data in a column but assigns a second label to one of the ten pieces of data, the native computing system 104 may reassign the label for the one piece of data to the first label (i.e., because the number of occurrences of the first label in the column exceeds the number of occurrences of the second label). In other aspects, the native computing system 104 analyzes a confidence score of each assigned label for a set of adjacent data, and modifies the assigned label for each piece of data in the set to include the highest confidence label applied to any piece of the adjacent data.

The native computing system may finalize a predicted label and produce a result at operation 450A. In various aspects, the final result may drive the metadata generation discussed herein with respect to the data discovery module 300. For example, referring back to FIG. 3, when generating the metadata regarding the target data discovered on the one or more data repositories 120 at operation 350, the data discovery module 300 may assign the finalized, predicted label as a data type for the target data. The data discovery module 300 may then store metadata for a particular data storage location on which the target data resides indicating that data of the type assigned to the target data is stored thereon. In some aspects, the native computing system 104 may assign a particular data type to date identified in a particular location based on the result produced at operation 450A.

FIG. 5 depicts an example of a process 501 for classifying unstructured data during a data discovery process are shown. For instance, process 501 includes operations performed by computing hardware found in the native computing system 104 as the computing hardware executes the data classification module 400.

At operation 41OB, the data classification module 400 accesses data. For instance, that native computing system 104 may access a data set (e.g., on one or more of the data repositories 120) as the native computing system 104 performs data discovery on the target computing system 100. In some aspects, the data may include any suitable data format (e.g., such as a table, string, email, document, etc.).

At operation 420B, the data classification module 400 performs advanced tokenization on the data set. This operation can be performed in the same manner as operation 420A described above.

At operation 430B, the native computing system 104 labels the tokenized data. This operation can be performed in the same manner as operation 430A described above.

At operation 435B, the native computing system 104 may use one or more validators on the labeled data (e.g., to improve a confidence of the predicted label). For example, in various aspects, the one or more validators may include, for example: (1) one or more Luhn validators to check for credit card or other numbers; (2) one or more Modulus checks to check for social security numbers, social insurance numbers, etc.; (3) and/or any other custom domain value check.

At operation 440B, the native computing system 104 executes a confidence workflow on the tokenized, labelled data. The native computing system 104 may determine a confidence level for a predicted label (e.g., using the machine-learning model). The native computing system 104 may apply a label to a particular data element in response to determining that the confidence level exceeds a particular threshold.

In some aspects, such as when the native computing system 104 is classifying data in an unstructured data source, the native computing system 104 may use one or more natural language processing techniques to identify particular attributes in the data such as country, name, etc. In other aspects, native computing system 104 is configured to apply natural language processing to identify any particular desired attribute within a data set (e.g., names, organizations, locations, etc.). In a particular aspect, the native computing system 104, at operation 442B is configured to apply Bidirectional Encoder Representations from Transformers (BERT) to the dataset (e.g., one or more data elements in the data set). In various aspects, BERT may include pre-trained bidirectional representations from the unlabeled text by jointly conditioning on both left and right contexts. In other aspects, the native computing system may use any other suitable machine-learning based natural language processing technique on the data elements to improve or modify a confidence score of a generated label prediction. The native computing system 104 may then finalize a predicted label and produce a result at operation 450B. In various aspects, the final result may drive the metadata generation discussed herein with respect to the data discovery module 300. In some aspects, the native computing system 104 may assign a particular data type to data identified in a particular location based on the result produced at operation 450B. For example, the native computing system 104 may assign the finalized, predicted label produced at operation 450B as the particular data type for the data identified in the particular location. The native computing system 104 may store metadata for the data identified in the particular location that indicates the finalized predicted label produced at operation 450B as the data type (e.g., name, country, address, e-mail address, etc.) for the particular data.

Data Indexing Module

Figure 6:
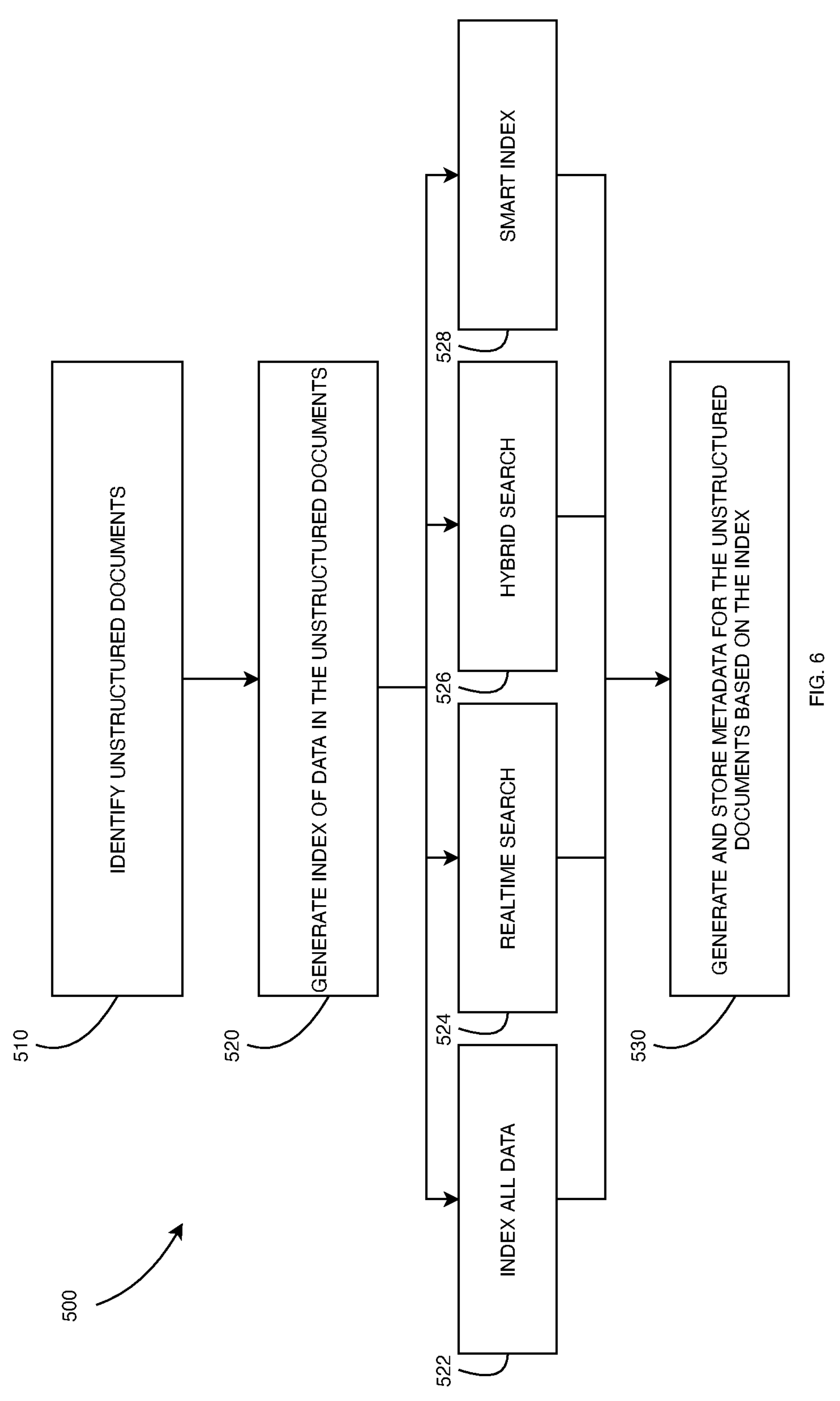
FIG. 6 depicts an example of a process for indexing data discovered on a target computing system in accordance with yet another aspect of the present disclosure.

FIG. 6 depicts an example of a process, performed by a data indexing module 500, for generating an index of data in unstructured (e.g., and/or structured) documents and generating and storing metadata for the unstructured documents indicating an occurrence of a particular piece of target data in the unstructured documents. The native computing system 104 may index data (e.g., in unstructured documents) according to one or more processes described herein, as the native computing system 104 performs data discovery (e.g., according to the data discovery module 300) on a target computing system. Each job in a job schedule described herein may include indexing the target data identified in a particular data source (e.g., by updating and maintaining an index). The operations shown in FIG. 6 can be performed by computing hardware found in the native computing system 104 that executes the data indexing module 500 (e.g., in conjunction with executing the data discovery module 300).

At operation 510, the data indexing module 500 identifies unstructured documents. When performing data discovery on a target computing system 100, at least a portion of the data on the system may reside in one or more unstructured documents. A technical challenge related to discovering target data in a particular computing system includes discovering instances of target data that exist in unstructured data on the system. As such, when encountering unstructured data during a data discovery process, it may be necessary to classify, label, and index the data in the unstructured documents to provide a mechanism for: (1) identifying target data in the unstructured documents; and (2) producing particular data from the unstructured documents as part of a response to a query requesting the target data (e.g., in response to a data subject access request).

At Operation 520, the native computing system 104 may generate an index of data in the unstructured documents. For example, the native computing system 104: may (1) index all data within one or more unstructured documents; (2) perform one or more real-time searches of all of the data in each of the one or more unstructured documents; (3) perform one or more hybrid searching and indexing techniques; (4) perform one or more smart indexing techniques; and/or (5) perform any other suitable searching and indexing technique on the one or more unstructured documents. In various aspects, the native computing system 104 may perform optical character recognition on the one or more unstructured documents.

When indexing all data in unstructured documents, the native computing system 104, at operation 522 builds and maintains an index of all data within the one or more unstructured documents. The native computing system 104 may, for example, maintain all data across all data sources (e.g., each of the one or more unstructured documents) in an index on each scan. In various aspects, in response to the native computing system 104 indexing all data within the one or more unstructured documents, the native computing system 104 replicates each piece of data (e.g., replicates each piece of existing data in the generated index). In some aspects, the creation of an index of all the data may enable a system to instantaneously find search terms within the index. For example, a system serving a data subject access request using the index may be able to search the index substantially instantaneously in order to identify search terms such as e-mail address, etc. (e.g., when serving data subject access requests on a targeted computing system 100 that includes the one or more unstructured documents for which the native computing system 104 generated the index). In various aspects, the native computing system 104 may generate the index during any suitable discovery process described herein.

In some aspects, as the native computing system 104 builds and maintains an index of all the data within each of the one or more unstructured documents (e.g., as more unstructured documents are identified and added to the index), the size of the index may grow with the size of the data (e.g., grow linearly with the data). In various aspects, the cost of maintaining and building the index may be relatively high (i.e., in terms of computing resources required to build and maintain the index). In such aspects, the cost of fulfilling a particular data subject access request, however, may be relatively low, as the native computing system 104 (e.g., or other computing system which may be processing such a request) may fulfil the data subject access request using the existing index (e.g., and/or provide the index for use by the other system for fulfilling the data subject access request).

At operation 524, the native computing system 104 performs one or more real-time searches of data in each unstructured document in order to process each received data subject access request. In operation 524, the native computing system 104 may not actively index data in the documents during the discovery process. In various aspects, such as when the native computing system 104 does not actively index unstructured documents, the native computing system may not replicate any data when relying on real-time searching (i.e., because the documents may be searched in response to a data subject access request rather than indexing the data on discovery). In such aspects, the process depicted in FIG. 6 may preserve computing resources by not creating additional copies of the data. In some aspects, relying on real-time searching to respond to a data subject access request may be slow, as the native computing system 104 may need to rescan a large number of identified documents for every data subject access request that the native computing system 104 receives. In some aspects, when relying on real-time searching, the native computing system 104 may preserve computing resources related to producing, maintaining, and storing an index, but the native computing system 104 may need to perform a full scan in response to each data subject access request received. As such, the native computing system 104 may optimize data subject access request response time by processing the requests in batches (e.g., weekly, monthly, etc.). In some aspects, batch frequency may be based on statutory response requirements.

When indexing the unstructured documents using a hybrid searching technique, the native computing system 104, at operation 526, may approximate a location of personally identifiable information or other target data in the unstructured documents. In such aspects, the native computing system 104 may maintain an index with a reduced file size (e.g., as compared to a complete index). In some aspects, hybrid searching and indexing may require partial data replication by the native computing system 104.

When indexing the unstructured documents using a smart searching technique, the native computing system 104, at operation 528, may only index personally identifiable information and other target data across all data sources on each scan. For example, the native computing system may only store a reference to discovered files for each piece of personally identifiable information (e.g., or other target data) that is discovered. In various aspects, smart indexing may only require data replication for unique target data (i.e., by supplementing the index upon discovery of a new piece of target data). For example, smart indexing may include generating, by the native computing system 104, an initial index on an initial scan of the target computing system 100. The initial index may include an index indicating, for each identified piece of target data, every location on the target computing system 100 in which the identified piece of target data is located (e.g., using a respective file reference or other location reference in the index). On subsequent scans of the target computing system 100, the native computing system 104 can supplement the index to include newly identified pieces of target data, and modify the index to include just a location reference for instances of target data that have been identified in a new location, but were already included in the index. In some aspects, smart indexing may increase a size of the generated index at rate of newly discovered target data elements. In some respects, when serving a data subject access request or other query on the data set that includes the unstructured documents, a system may utilize OCR for each request, but only for documents that are known to contain the target data.

At operation 530, the native computing system 104 generates and stores metadata for the unstructured documents based on the index. For example, the native computing system 104 may store metadata for the unstructured documents that identifies a location of particular instances of target data across all of the documents. For example, the metadata may define a respective file reference for each instance of the particular piece of target data discovered across the target computing system 100 and store the file reference in association with the piece of target data in the index. For a particular e-mail address (e.g., user@mail.com) that appears in 25 different files in the target computing system 100, the native computing system may store, in the index, the e-mail address user@mail.com in association with a respective file reference for each of the 25 different files. In this way, when serving a data subject access request for the e-mail address user@gmail.com, the native computing system 104 may use the index to limit a search for target data for the data subject associated with that e-mail to those 25 different files identified by the index.

Example Technical Platforms

Aspects of the present disclosure may be implemented in various ways, including as computer program products that include articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

According to various aspects, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

According to various aspects, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various aspects are described to use a computer-readable storage medium, other types of computer-readable storage media may be substituted for or used in addition to the computer-readable storage media described above.

Various aspects of the present disclosure may also be implemented as methods, apparatuses, systems, computing devices, computing entities, and/or the like. As such, various aspects of the present disclosure may take the form of a data structure, apparatus, system, computing device, computing entity, and/or the like executing instructions stored on a computer-readable storage medium to perform certain steps or operations. Thus, various aspects of the present disclosure also may take the form of entirely hardware, entirely computer program product, and/or a combination of computer program product and hardware performing certain steps or operations.

Various aspects of the present disclosure are described below with reference to block diagrams and flowchart illustrations. Thus, each block of the block diagrams and flowchart illustrations may be implemented in the form of a computer program product, an entirely hardware aspect, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some examples of aspects, retrieval, loading, and/or execution may be performed in parallel such that multiple instructions are retrieved, loaded, and/or executed together. Thus, such aspects can produce specially configured machines performing the steps or operations specified in the block diagrams and flowchart illustrations. Accordingly, the block diagrams and flowchart illustrations support various combinations of aspects for performing the specified instructions, operations, or steps.

Example System Architecture

Figure 7:
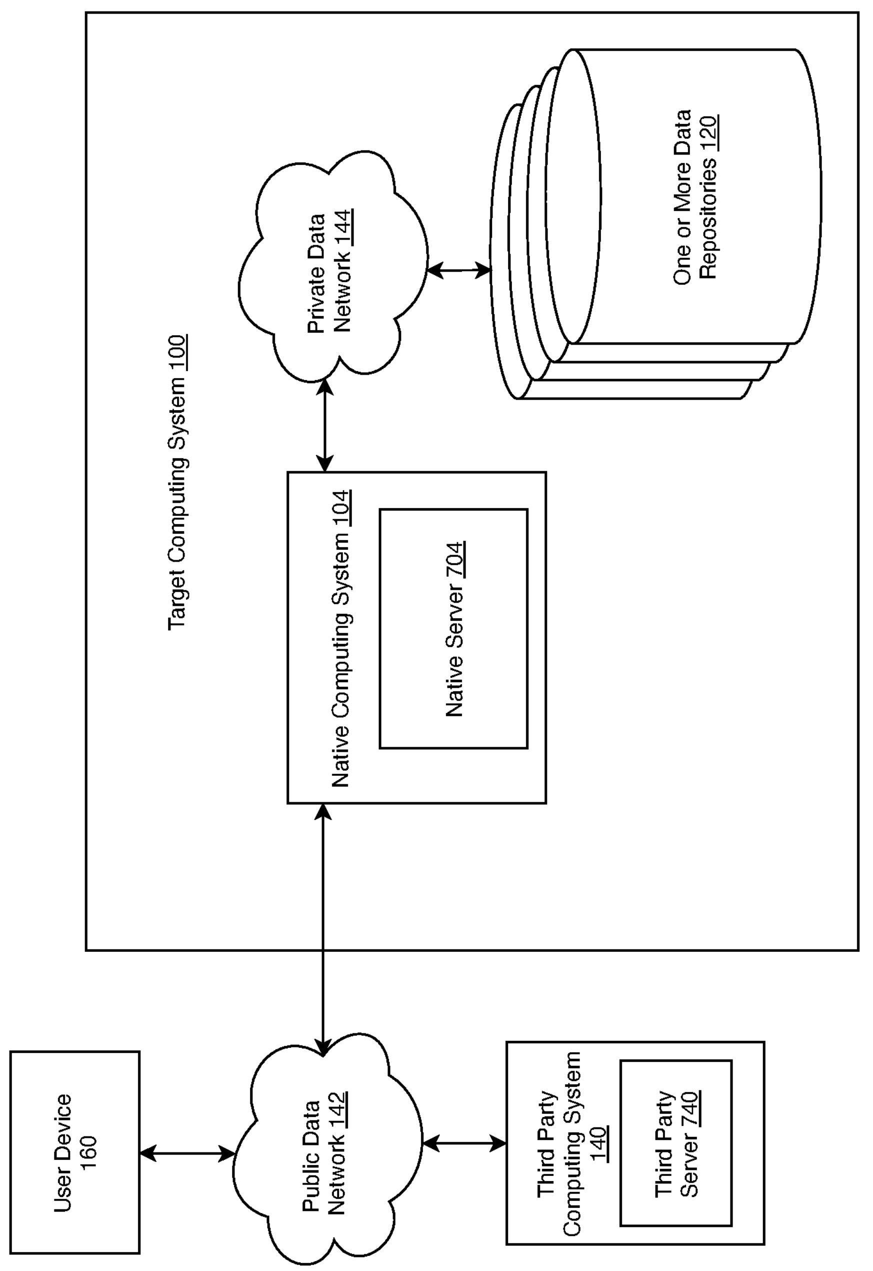
FIG. 7 depicts an example of a system architecture that may be used in accordance with various aspects of the present disclosure.

FIG. 7 depicts an example of a computing environment that can be used for discovering, classifying, and/or indexing target data stored across data assets that may be spread over one or more data repositories in a target computing system in accordance with various aspects of the present disclosure. Components of the system architecture 700 are configured according to various aspects to discover target data on a target computing system 100.

As may be understood from FIG. 7, the system architecture 700 according to various aspects may include a target computing system that includes a native computing system 104 and one or more data repositories 120. The native computing system 104 further includes one or more native servers 704. Although the target computing system 100, native computing system 104, and one or more data repositories 120 are shown as separate components, according to other aspects, these components may include a single server and/or repository, servers and/or repositories, one or more cloud-based servers and/or repositories, or any other suitable configuration.

In addition, the system architecture 700 according to various aspects may include a third-party computing system 140 that includes one or more third party servers 740. Although the third party server 740 and third-party computing system 140 are shown as separate components, according to other aspects, these components 140, 740 may include a single server and/or repository, servers and/or repositories, one or more cloud-based servers and/or repositories, or any other suitable configuration.

The native server(s) 704, third party servers 740, and/or other components may communicate with, access, and/or the like with each other over one or more networks, such as via a public data network 142 and/or a private data network 144. According to particular aspects, the third party server 740 may provide one or more graphical user interfaces through which personnel of an entity can interact with the native computing system 104 (e.g., via a client application). Furthermore, the third party server 740, and/or native server 704, may provide one or more interfaces that allow the target computing system 100, the native computing system 104, and/or the third-party computing system to communicate with each other such as one or more suitable application programming interfaces (APIs), direct connections, and/or the like.

Example Computing Hardware

Figure 8:
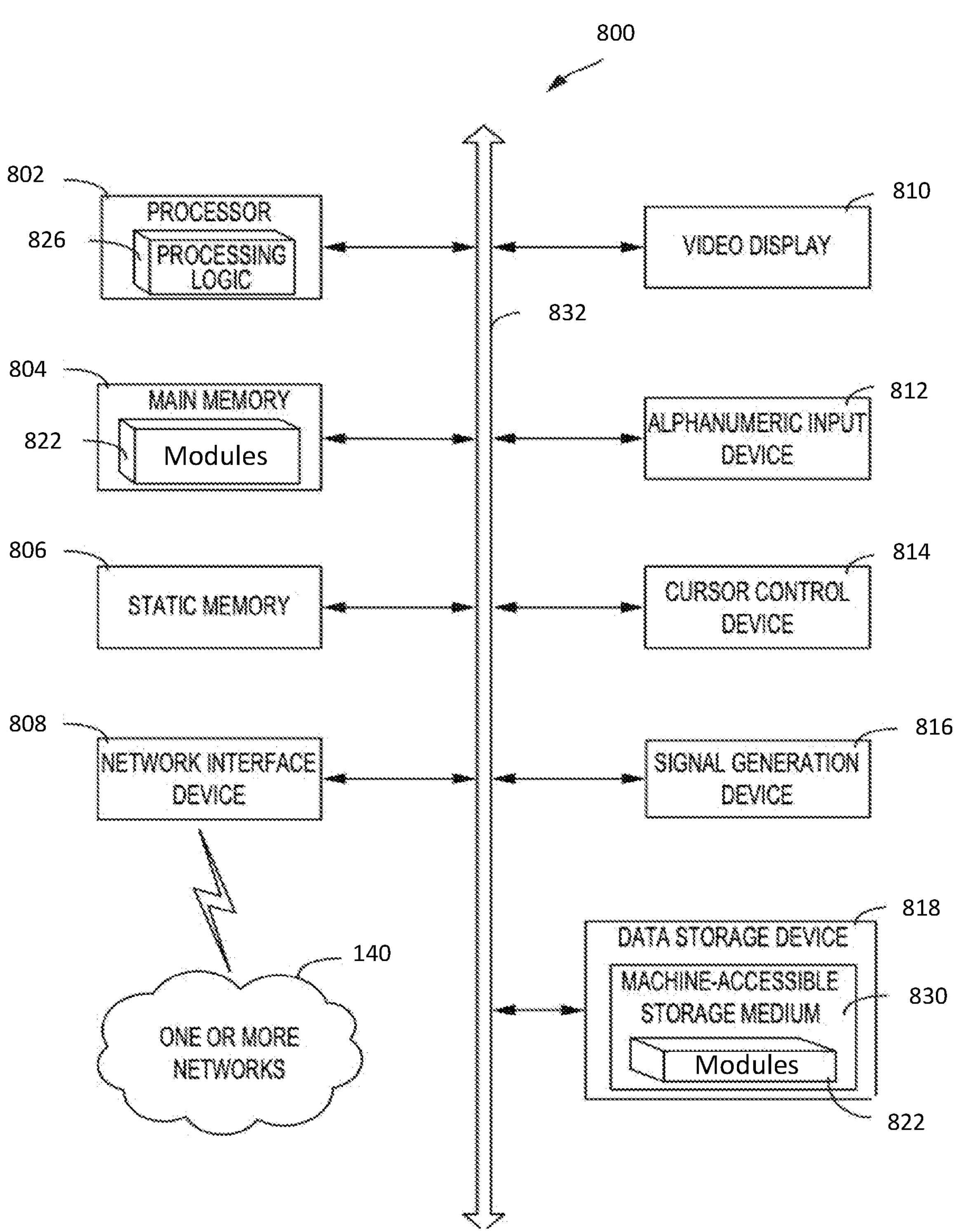
FIG. 8 depicts an example of a computing entity that may be used in accordance with various aspects of the present disclosure.

FIG. 8 illustrates a diagrammatic representation of a computing hardware device 800 that may be used in accordance with various aspects of the disclosure. For example, the hardware device 800 may be computing hardware such as a third party server 740, and/or native server 704 as described in FIG. 7. According to particular aspects, the hardware device 800 may be connected (e.g., networked) to one or more other computing entities, storage devices, and/or the like via one or more networks such as, for example, a LAN, an intranet, an extranet, and/or the Internet. As noted above, the hardware device 800 may operate in the capacity of a server and/or a client device in a client-server network environment, or as a peer computing device in a peer-to-peer (or distributed) network environment. According to various aspects, the hardware device 800 may be a personal computer (PC), a tablet PC, a set-top box (STB), a Personal Digital Assistant (PDA), a mobile device (smartphone), a web appliance, a server, a network router, a switch or bridge, or any other device capable of executing a set of instructions (sequential or otherwise) that specify actions to be taken by that device. Further, while only a single hardware device 800 is illustrated, the term "hardware device," "computing hardware," and/or the like shall also be taken to include any collection of computing entities that individually or jointly execute a set (or multiple sets) of instructions to perform any one or more of the methodologies discussed herein.

A hardware device 800 includes a processor 802, a main memory 804 (e.g., read-only memory (ROM), flash memory, dynamic random-access memory (DRAM) such as synchronous DRAM (SDRAM), Rambus DRAM (RDRAM), and/or the like), a static memory 806 (e.g., flash memory, static random-access memory (SRAM), and/or the like), and a data storage device 818, that communicate with each other via a bus 832.

The processor 802 may represent one or more general-purpose processing devices such as a microprocessor, a central processing unit, and/or the like. According to some aspects, the processor 802 may be a complex instruction set computing (CISC) microprocessor, reduced instruction set computing (RISC) microprocessor, very long instruction word (VLIW) microprocessor, a processor implementing other instruction sets, processors implementing a combination of instruction sets, and/or the like. According to some aspects, the processor 802 may be one or more special-purpose processing devices such as an application specific integrated circuit (ASIC), a field programmable gate array (FPGA), a digital signal processor (DSP), network processor, and/or the like. The processor 802 can execute processing logic 826 for performing various operations and/or steps described herein.

The hardware device 800 may further include a network interface device 808, as well as a video display unit 810 (e.g., a liquid crystal display (LCD), a cathode ray tube (CRT), and/or the like), an alphanumeric input device 812 (e.g., a keyboard), a cursor control device 814 (e.g., a mouse, a trackpad), and/or a signal generation device 816 (e.g., a speaker). The hardware device 800 may further include a data storage device 818. The data storage device 818 may include a non-transitory computer-readable storage medium 830 (also known as a non-transitory computer-readable storage medium or a non-transitory computer-readable medium) on which is stored one or more modules 822 (e.g., sets of software instructions) embodying any one or more of the methodologies or functions described herein. For instance, according to particular aspects, the modules 822 include data discovery deployment and scheduling module 200, the data discovery module 300, the data classification module 400, and the data indexing module 500 as described herein. The one or more modules 822 may also reside, completely or at least partially, within main memory 804 and/or within the processor 802 during execution thereof by the hardware device 800—main memory 804 and processor 802 also constituting computer-accessible storage media.

The one or more modules 822 may further be transmitted or received over a network 140 via the network interface device 808.

While the computer-readable storage medium 830 is shown to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the hardware device 800 and that causes the hardware device 800 to perform any one or more of the methodologies of the present disclosure. The term "computer-readable storage medium" should accordingly be understood to include, but not be limited to, solid-state memories, optical and magnetic media, and/or the like.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

Conclusion

While this specification contains many specific aspect details, these should not be construed as limitations on the scope of any invention or of what may be claimed, but rather as descriptions of features that may be specific to particular aspects of particular inventions. Certain features that are described in this specification in the context of separate aspects also may be implemented in combination in a single aspect. Conversely, various features that are described in the context of a single aspect also may be implemented in multiple aspects separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various aspects described above should not be understood as requiring such separation in all aspects, and the described program components (e.g., modules) and systems may be integrated together in a single software product or packaged into multiple software products.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for the purposes of limitation.

What is claimed is:

1. A target computing system comprising:

one or more computing devices having access to data at a plurality of data sources;

at least one processing device of an external-facing subsystem; and a non-transitory computer-readable medium comprising instructions that, when executed by the at least one processing device, cause the at least one processing device to perform operations comprising:

deploying executable code to the one or more computing devices to perform scanning and classification operations at the plurality of data sources;

causing the one or more computing devices to execute the executable code to scan the plurality of data sources for target data;

causing the one or more computing devices to execute the executable code to generate data type predictions for the target data; and responsive to scanning and classifying the target data stored on the plurality of data sources, causing the one or more computing devices to send the data type predictions for the target data to a third-party computing system without sending the target data.

2. The target computing system of claim 1, wherein deploying the executable code to the one or more computing devices comprises:

executing a client application to expose online functions to the third-party computing system; and deploying, utilizing the client application, the executable code to the one or more computing devices to perform the scanning and classification operations in connection with one or more operations at the third-party computing system.

3. The target computing system of claim 2, wherein causing the one or more computing devices to execute the executable code to scan the plurality of data sources for the target data comprises:

generating a job schedule comprising a plurality of jobs based on computing resource data of the one or more computing devices; and causing the one or more computing devices to execute the executable code to scan the plurality of data sources according to the plurality of jobs in the job schedule and the computing resource data of the one or more computing devices.

4. The target computing system of claim 3, wherein causing the one or more computing devices to execute the executable code to scan the plurality of data sources for the target data comprises causing the one or more computing devices to execute one or more scripts associated with each job of the plurality of jobs of the job schedule.

5. The target computing system of claim 3, wherein generating the job schedule comprises scheduling the plurality of jobs to limit a number of simultaneous jobs at the one or more computing devices to a particular number of simultaneous jobs according to the computing resource data.

6. The target computing system of claim 3, wherein the operations further comprise determining the computing resource data by determining current resource usage by the one or more computing devices and total available resources of the one or more computing devices.

7. The target computing system of claim 1, wherein causing the one or more computing devices to execute the executable code to generate the data type predictions for the target data comprises:

causing the one or more computing devices to generate tokenized data by tokenizing the data of the plurality of data sources; and causing the one or more computing devices to generate one or more classifications indicating types of the target data based on the tokenized data.

8. The target computing system of claim 7, wherein causing the one or more computing devices to generate the one or more classifications comprises causing the one or more computing devices to determine a label for a data item at a data source of the plurality of data sources indicating a data type in response to determining that a confidence level of a prediction indicating the data type exceeds a threshold.

9. The target computing system of claim 1, further comprising:

generating metadata comprising a predicted label as a data type for a data item of the target data and a storage location of the data item of the target data at a data source of the plurality of data sources; and storing the metadata comprising the predicted label for the data item of the target data and the storage location of the data item of the target data at the data source of the plurality of data sources.

10. A method comprising:

deploying, by an external-facing subsystem of a target computing system, executable code to one or more computing devices of the target computing system having access to data at a plurality of data sources of the target computing system to perform scanning and classification operations at the plurality of data sources;

generating, by the external-facing subsystem, a job schedule comprising a plurality of jobs corresponding to a plurality of data items at the plurality of data sources;

causing, by the external-facing subsystem, the one or more computing devices of the target computing system to execute the executable code to scan the plurality of data sources for target data according to the plurality of jobs of the job schedule;

causing, by the external-facing subsystem, the one or more computing devices of the target computing system to execute the executable code to generate classifications of data types for the target data at the plurality of data sources; and responsive to scanning and classifying the target data stored on the plurality of data sources, generating and storing metadata for the plurality of data sources, the metadata indicating types of the target data and storage locations of the target data at the plurality of data sources.

11. The method of claim 10, further comprising:

responsive to a request to query the plurality of data sources in connection with a data subject access request, accessing the metadata for the plurality of data sources to identify a subset of the plurality of data sources that store a subset of the target data corresponding to the data subject access request; and causing, by the external-facing subsystem, execution of processing operations to retrieve the subset of the target data from the subset of the plurality of data sources storing the subset of the target data.

12. The method of claim 10, wherein deploying the executable code to the one or more computing devices comprises:

executing a client application that exposes online functions of the target computing system to a third-party system; and deploying, utilizing the client application, the executable code to the one or more computing devices to perform the scanning and classification operations in connection with one or more operations at the third-party system.

13. The method of claim 10, wherein causing the one or more computing devices of the target computing system to execute the executable code to scan the plurality of data sources for the target data comprises executing one or more scripts associated with each job of the plurality of jobs of the job schedule.

14. The method of claim 13, wherein generating the job schedule comprises:

determining computing resource data comprising current resource usage by the one or more computing devices of the target computing system and total available resources of the one or more computing devices of the target computing system; and scheduling the plurality of jobs to limit a number of simultaneous jobs at the one or more computing devices to a particular number of simultaneous jobs according to the computing resource data.

15. The method of claim 10, wherein causing the one or more computing devices of the target computing system to execute the executable code to generate the classifications of the data types for the target data comprises:

causing the one or more computing devices to generate tokenized data by tokenizing the data of the plurality of data sources;

causing the one or more computing devices to generate labelled data by labeling the tokenized data; and causing the one or more computing devices to generate the classifications of the data types for the target data based on the labelled data.

16. The method of claim 10, wherein causing the one or more computing devices to execute the executable code to scan the plurality of data sources for the target data according to the plurality of jobs of the job schedule comprises causing the one or more computing devices to schedule a scanning operation during at least one of a particular time period, a particular time of day, or during a particular day.

17. A non-transitory computer-readable medium comprising instructions that, when executed by computing hardware of an external-facing subsystem of a target computing system, cause the computing hardware to:

deploy executable code to one or more computing devices of the target computing system having access to data at a plurality of data sources of the target computing system to perform scanning and classification operations at the plurality of data sources;

cause the one or more computing devices of the target computing system to execute the executable code to scan the plurality of data sources for target data;

cause the one or more computing devices of the target computing system to execute the executable code to generate classifications of data types for the target data at the plurality of data sources; and responsive to scanning and classifying the target data stored on the plurality of data sources, generate and store, for data source of the plurality of data sources, metadata indicating types and storage locations of the target data at the data source of the plurality of data sources.

18. The non-transitory computer-readable medium of claim 17, further comprising instructions that, when executed by the computing hardware, cause the computing hardware to cause the one or more computing devices of the target computing system to execute the executable code to scan the plurality of data sources for the target data by:

generating a job schedule comprising a plurality of jobs based on computing resource data of the one or more computing devices;

determining current resource usage by the one or more computing devices of the target computing system and total available resources of the one or more computing devices of the target computing system; and causing the one or more computing devices to execute the executable code to scan the plurality of data sources according to the plurality of jobs in the job schedule and the computing resource data.

19. The non-transitory computer-readable medium of claim 17, further comprising instructions that, when executed by the computing hardware, cause the computing hardware to cause the one or more computing devices of the target computing system to execute the executable code to generate the classifications of the data types for the target data at the plurality of data sources by:

causing the one or more computing devices to generate tokenized data by tokenizing the data of the plurality of data sources; and causing the one or more computing devices to generate the classifications indicating the data types for the target data based on the tokenized data.

20. The non-transitory computer-readable medium of claim 17, further comprising instructions that, when executed by the computing hardware, cause the computing hardware to:

responsive to a request to query the plurality of data sources in connection with a data subject access request, access the metadata for the plurality of data sources to identify a subset of the plurality of data sources that store a subset of the target data corresponding to the data subject access request; and cause execution of processing operations to retrieve the subset of the target data from the subset of the plurality of data sources storing the subset of the target data.

* * * * *